Patented Apr. 11, 1944

2,346,210

UNITED STATES PATENT OFFICE 2,346,210

METHOD FOR IMPROVING ORGANIC DERIVATIVES OF CELLULOSE

Bruce S. Farquhar, Waynesboro, Va., assignor to E. I. du Pont de Nemours & Company, Wilmington, Del., a corporation of Delaware No Drawing. Application February 5, 1941, Serial No. 377,573

1 Claim. (Cl. 18—47.5)

This invention relates to the treatment of dry organic derivatives of cellulose. More particularly, it relates to a method of treating dry cellulose acetate whereby to render the cellulose acetate free-flowing, to lessen its tendency to dust, and to improve its physical characteristics in general.

Commercial methods at present employed in the preparation of cellulose acetate yield a dry product in the form of a spongy material of variable size and shape. The material as it is discharged from the drier varies in size from dust up to lumps the size of peas or hickory nuts and sometimes even larger, and in general, the shape is most irregular. These physical characteristics are undesirable for the reason that the material does not flow easily and due to the presence of dust and the tendency to form more dust, the handling of such material is difficult, hazardous and expensive in the various operations such as grinding, compounding, transporting, dissolving, and the like, to which it is subjected in the formulation of molding powders and spinning and casting solutions.

An object of this invention is to provide a method for conditioning dry cellulose acetate to improve the handling qualities thereof.

Another object resides in the treatment of dry cellulose acetate so as to render the cellulose acetate uniform in size, free-flowing, and to reduce to a minimum its tendency to dust.

A still further object is to improve those properties of cellulose acetate which are a factor in the handling thereof, and at the same time maintain the required high standards of chemical quality.

These and other objects will more clearly appear hereinafter.

These objects are accomplished by the following described invention.

I have found that if cellulose acetate is subjected to dry pressing at extremely high pressures a relatively dense cake or tablet is formed which, when milled, yields a finely divided, free-flowing, non-dusting material of substantially uniform particle size.

Dry pressing may be best accomplished by use of tableting machines and like arrangements wherein movement of the particles relative to the press surfaces of the machine is at a minimum. The pressing of cellulose acetate between pressure rolls gives non-uniform results and the forcing of cellulose acetate, under high pressure, through extrusion dies gives rise to the generation of considerable frictional heat, and such pressing methods generally are not so satisfactory.

The dry cellulose acetate should be subjected to a pressure of not less than about 2500 pounds per square inch, and preferably the pressure should be within the range of about 10,000 to about 40,000 pounds per square inch. At pressures below about 2500 pounds per square inch no appreciable improvement in the cellulose acetate is effected. Pressures in excess of 40,000 pounds per square inch may be applied but the added advantages realized are not sufficient to be practical.

By "dry pressing" is meant that the cellulose acetate undergoing this treatment contains no more than the normal regain moisture, i. e. 5% or 6% by weight of water, although it is preferred that the cellulose acetate be pressed in accordance with this invention in as dry a state as possible, for instance while it contains less than 2% by weight of water.

Preferably the pressing should take place in a pressure mold wherein the pressure of not less than 2500 pounds per square inch is applied more or less uniformly, for instance by means of a hydraulically moved or mechanically moved plunger. A cylindrical member holding the cellulose acetate to be pressed and provided with a smooth, flat-faced end and a smooth, flat-faced cylindrical plunger working therein has been found very satisfactory. Circular, disc-like tablets may thus be produced, having a diameter of from 0.5 inch to 2 inches, or more, and a thickness of from 0.1 inch to 0.5 inch, or more. The tablets thus obtained may be shipped directly to the molding powder manufacturer or may be subjected to grinding and sold as ground material. The ground material is free-flowing, with very little tendency toward dusting, of uniform particle size, and is in condition for satisfactory and economical handling. The chemical quality of the cellulose acetate is not affected by the pressing operation.

Furthermore, it has been found that the cellulose acetate dust, which normally occurs in cellulose acetate production (due to squeezing the wet material to mechanically remove as much water as possible before air drying) and which at times may amount to as much as 2% or 3% and up to 10% of the total cellulose acetate charge, may be subjected to pressing according to this invention, and subsequently ground or milled. The dust so treated is found to be substantially the same in all respects as the main portion of the charge treated in the same way, and may be handled the same as the normal material. By making use of this invention, there has been found no valid reason to segregate this portion of the charge and, obviously, this further reduces the handling cost, whereas heretofore the dust, if used at all, was used with considerable difficulty.

It may be desirable in some cases to separate the dust from the bulk of the cellulose acetate production and tablet only the dust. For instance, use may be made of an air classifier (a baffled tower wherein the larger particles of cellulose acetate settle to the bottom while air passing upward therethrough carries away the dust) and a dust separator suitably connected together by pipe lines and to a fan or blower. The air which is freed from dust may be recycled and the dust from the separator dropped into a tableting machine or the like where it is pressed in accordance with this invention, ground and mixed with the dust-free cellulose acetate or with the unclassified cellulose acetate and passed therewith through the air classifier again. For some purposes it may even be desirable to dry press and grind the entire production and then pass it through the air classifier to remove a very minor proportion of dust which dust subsequently can be repressed and reground along with the unclassified material.

Although this invention has been described with specific reference to cellulose acetate, it is equally applicable to the dry pressing of other organic derivatives of cellulose, such as cellulose butyrate, cellulose propionate, cellulose acetate butyrate, cellulose acetate propionate, ethyl cellulose, benzyl cellulose, etc., to improve the handling characteristics of such materials without deleteriously affecting their properties.

Since it is obvious that my invention is susceptible to many modifications and changes in addition to the specific embodiment herein disclosed, the invention is not to be limited except in accordance with the spirit and terms of the following claim.

I claim:

The process which comprises dry pressing cellulose acetate at a pressure within the range of from about 10,000 to about 40,000 pounds per square inch whereby to form tablets, and grinding the tablets to the desired degree of fineness.

BRUCE S. FARQUHAR.